(12) United States Patent
Nemish

(10) Patent No.: US 9,421,833 B1
(45) Date of Patent: Aug. 23, 2016

(54) REINFORCED VALVE STEM

(71) Applicant: Stephen C. Nemish, Valley Park, MO (US)

(72) Inventor: Stephen C. Nemish, Valley Park, MO (US)

( * ) Notice: Subject to any disclaimer, the term of this patent is extended or adjusted under 35 U.S.C. 154(b) by 411 days.

(21) Appl. No.: 13/963,534

(22) Filed: Aug. 9, 2013

Related U.S. Application Data

(60) Provisional application No. 61/681,891, filed on Aug. 10, 2012.

(51) Int. Cl.
*B60C 23/02* (2006.01)
*B60C 29/00* (2006.01)

(52) U.S. Cl.
CPC .................... *B60C 29/005* (2013.01)

(58) Field of Classification Search
CPC ...... B60C 29/00; B60C 29/002; B60C 29/005
USPC .................................. 152/427–429
See application file for complete search history.

(56) References Cited

U.S. PATENT DOCUMENTS

| 3,610,312 | A | * | 10/1971 | Kilmarx | B60C 29/02 152/381.3 |
|---|---|---|---|---|---|
| 3,830,277 | A | * | 8/1974 | Lejeune | B60C 29/02 152/427 |
| 4,049,037 | A | * | 9/1977 | Gale | B60C 29/02 152/427 |
| 4,077,456 | A | * | 3/1978 | Smith | B60C 29/02 137/223 |
| 6,722,409 | B1 | * | 4/2004 | Martin | B60C 23/0494 152/415 |
| 7,086,412 | B2 | * | 8/2006 | Uleski | B60C 23/0408 137/223 |
| 2011/0175716 | A1 | * | 7/2011 | Medley | B60C 23/002 340/442 |

* cited by examiner

*Primary Examiner* — Jason Bellinger
(74) *Attorney, Agent, or Firm* — Charles McCloskey

(57) ABSTRACT

A reinforced valve stem has two perpendicular tubes, a first tube generally inwardly of a rim and a second tube outwardly and perpendicular to a rim of a wheel. The first tube receives a valve stem and has a threaded inlet for connection to an air source. The second tube threadily connects to the first tube opposite the valve and has an internal smooth passage for providing air into a tire mounted upon a rim. The second tube has a threaded outlet that receives an umbrella nut. The second tube also has an exterior wedge and a truncated conical heel spaced slight above the wedge. The conical heel merges into a shoulder that rotates through the merge of the two tubes to a neck just before the inlet.

7 Claims, 3 Drawing Sheets

REINFORCED VALVE STEM

CROSS-REFERENCE TO RELATED APPLICATION

This non-provisional application claims priority to the provisional application 61/681,891 filed on Aug. 10, 2012 which is owned by the same inventor.

BACKGROUND OF THE INVENTION

The reinforced valve stem generally relates to valves for air inflation and more specifically to a valve that inserts from the exterior through a rim to the interior of a tire.

In bays, shops, and along roads, numerous tires have their valves, more particularly valve stems changed. Tires have their tread that meets the road and sidewalls perpendicular to the tread. Tires have sidewalls upon both sides of the tire that extend partially towards the center, or towards a rim. At the innermost portion of each sidewall, the tire has an encased bead. The bead is a thickened portion of the sidewall surrounding metal wire. A wheel generally has two parallel and spaced apart rims upon its circumference. The rims have a greater diameter than the substantial portion of the tire's inner circumference. The beads then mount against the rim sealing the tire to the rim. The rims extended upon the edges of a wall to which the spokes of the wheel join. The wheel contains one aperture through the wall that allows passage of air into the tire.

The aperture admits a valve to regulate the admission of air into the tire. The valve generally inserts from between the rims, through the wall, with its tip located inwardly, that is, towards the center of the wheel. The valve has a biased member that closes upon an internal aperture, retaining air within the tire. A tight seal of the bead allows for inflation of the tire without an inner tube. Inflation occurs upon a user placing an air hose upon the valve. Air pressure from the hose exceeds the strength of the biased member so that the member relaxes and allows air to flow into the tire. The air then attains the proper pressure and the user removes the air hose from the valve so that the biased member seals the internal aperture again, keeping the tire inflated.

Valve stems are used on many vehicles including motorcycles. From time to time, a valve stem fails for a host of reasons and a motorcycle rider or shop has to replace the valve. Existing valves require removing the wheel from the motorcycle and demounting the tire from the wheel. The user then inserts a valve as described above. Changing a valve requires many steps.

DESCRIPTION OF THE PRIOR ART

Traditionally, valve stems install from the inside of a wheel to the outside where a rider accesses the stem for filing of the tire. A traditional valve stem utilizes tools, such as wrenches and pliers, during its installation. The tools place the stem within the valve body and secure it therein for passage and regulation of air into the tire. During usage of the tools, a tool may bump or otherwise abrade the wheel. In time, the abrasions may corrode or otherwise produce a blemish upon the wheel, particularly a chrome wheel. Owners of motorcycles avoid such blemishes at high cost and frown upon mechanics or shops that cause them.

Tools also see usage when a wheel has an irregular hole or a wheel has an irregular parting line as in BMW rims. The tools position and secure the prior art valve stems upon the wheel. But the tools run the risk of abrading the wheel to the consternation of the motorcycle owner.

Over months and years of use and many miles of riding, a prior art valve body may pull through its hole in the wheel. The rotational forces over the miles draw in the valve to the axis of rotation. Stopping and starting rotation drags the valve body against the rim edges at the hole. In time, a valve body may wear leading to an air leak though the rest of the tire has no defects.

The preceding description generally applies to straight valves. Select prior art valves also have an elbow, or 90°, bend. The bend places the working end of the valve at a known position to the rider and outwardly from the congested space with adjacent wheel spokes. The elbow valve has a straight portion in communication to the tire and an angled portion perpendicular to one end of the straight portion. The angled portion appears outwardly from the wheel. Some elbow valves are installed better than others.

Over months and years of use and many miles of riding with an elbow valve in a wheel, the elbow valve has a doubly heightened risk of air leak. An elbow valve also feels the centripetal forces during rotation of the wheel and the cessation of those forces when the motorcycle stops. The cyclic loading of the angled portion produces moment on the angled portion leading to its bending, typically inwardly to the straight portion. This bending begins to weaken the knee of the valve where the angled portion joins to the straight portion. The bending activity and moment also impose stress upon the straight portion proximate the wheel. Doing so induces fatigue upon the straight portion generally opposite the bend. The bending and fatigue lead to pinholes in the straight portion causing air leaks to an otherwise good tire. This issue has appeared with some regularity in Goldwing® motorcycles.

The prior art has many valves both straight and elbow to supply and regulate the air pressure in a motorcycle tire. However, the prior art shares the common disadvantage of marring the rim of a wheel during usage of tools for valve installation. In elbow valves, usage leads to air leaks from bent valve portions. Select prior art elbow valves also use umbrella nuts. The umbrella nuts seat against a hard washer or upon the rim itself to seal the valve to the rim. However, upon turning the remainder of the elbow valve, typically outside the tire cavity, the umbrella nut loosens. This loosening allows the elbow valve to move causing intermittent air leaks. The loosening may advance so the umbrella nut falls into the tire cavity which detaches the remainder of the valve from the rim. And in straight valves, usage also leads to air leaks or pullouts as the valve body degrades from abrasion of the adjacent wheel rim. Straight valves with umbrella nuts also face the hazards of loosening the umbrella nuts inside the tire cavity. For drivers and cyclists sensitive to the appearance of their wheels, marring is not acceptable nor is an air leak of a perfectly good tire.

The present invention overcomes the difficulties of marring a wheel during valve installation and removal, and of air leaks from usage or loosened umbrella nuts. The present invention seeks to use its mechanical advantages so it remains fixed and closed in the operating environments encountered by motorcycle riders and operators of tired vehicles of all description.

SUMMARY OF THE INVENTION

Generally, the present invention provides a valve stem of two perpendicular tubes in a generally L shape and the first tube locating generally inwardly of a rim and the second tube locating outwardly and perpendicular to a rim of a wheel. The first tube receives a valve and has a threaded inlet for connection of the invention to a pressurized air source. The second tube threadily connects to the first tube opposite the valve and has internal smooth passage for providing air into a tire mounted upon a rim. The second tube has a threaded outlet that receives an umbrella nut thereon during installation of the valve stem upon a rim. The second tube also has an exterior wedge proximate the outlet and a truncated conical heel spaced slight above the wedge. The conical heel merges into a shoulder that rotates through the ninety degree connection of the two tubes to a neck just before the inlet. The inlet receives a polymer cap as its cover as is commonly done. The exterior wedge, heel, shoulder, and neck have a somewhat flexible, resilient material that allows for insertion of the wedge into a hole in the rim and sealing of the invention to the rim.

There has thus been outlined, rather broadly, the more important features of the invention in order that the detailed description thereof that follows may be better understood and that the present contribution to the art may be better appreciated. The present invention also includes a threaded connection of the first tube to the second tube, a passage in the second tube for transmission of air into a tire, a threaded chamber in the first tube for receiving a valve, various rings upon the tubes for securement of the wedge, heel, and shoulder thereon, and a machined seat within the first tube opposite the inlet. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a new and improved reinforced valve stem.

Another object is to provide such a reinforced valve stem that inserts from the outside in upon a wheel.

Another object is to provide such a reinforced valve stem that engages upon a wheel rim without marring it.

Another object is to provide such a reinforced valve stem that inserts into a wheel rim without power tools.

Another object is to provide such a reinforced valve stem that does not pull out.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
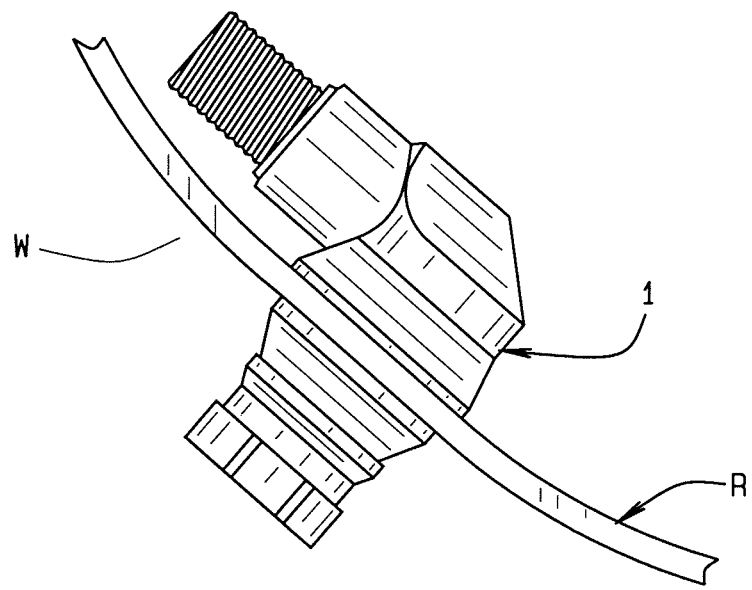
FIG. 1 shows a side view of the present invention installed upon a wheel rim.

The present art overcomes the prior art limitations by providing a valve stem of a generally L like shape that inserts into the rim of a wheel through a hole from outside the rim inwardly towards its hub. The present invention 1 installs upon a rim as shown in FIG. 1 in a partial side view of a rim R of a wheel W. The wheel has its generally round shape and the rim has its outer and inner radii as set by the manufacturer. The manufacturer, or in some instances, a tire dealer, provides a hole through the rim for admission of a valve as the present invention 1. Sometimes the hole may have an irregular size or shape and other times the hole may be on a parting line with an irregular surface. The present invention inserts from the outside in, that is, the valve inserts through the hole from the same surface as the valve remains accessible for filling with air. The umbrella nut of the invention, as later described, seats against the invention and compresses the invention against the rim. The umbrella nut of the invention does not contact the rim itself.

Figure 2:
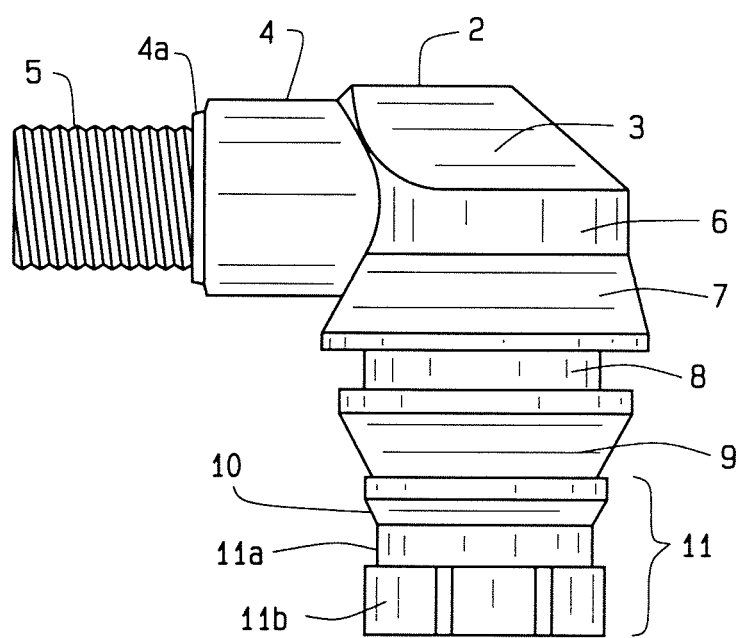
FIG. 2 shows a side view of the present invention.

Prior to installation, the present invention 1 assembles as shown in a side view in FIG. 2. The reinforced valve stem as at 1 has a shoulder 2 generally cylindrical with a partial conical bevel 3. Laterally outward from the shoulder, the invention 1 has a round neck 4. The neck has an outer diameter that exceeds the length of the shoulder but remains within the width of the shoulder as later shown in FIG. 5. The neck steps inwardly slightly in width, as at 4a, and a threaded inlet 5 extends further outwardly from the neck. The inlet receives an air chuck, not shown, during inflation of a tire. The inlet has a minimum length suitable for engaging a typical air chuck and a typical valve cap. The inlet remains hollow to allow passage of air and other gases through the invention. A valve stem later shown in FIG. 6 regulates air flow through the invention during usage.

Perpendicular to the neck 4 and extending beneath the shoulder 2 and the bevel 3, the invention 1 has its hip 6 generally round and of greater diameter than the neck 4. The hip has its length, noticeably less than that of the bevel and remains hollow for passage of air. Beneath the hip, the invention widens through an inverted truncated conical shape or heel 7. The heel has a maximum diameter greater than the diameter of the hip and a length slightly less than that of the shoulder and slightly more than that of the hip. The heel has an outward taper outwardly from the shoulder. The heel abuts the inside surface of a rim R when the invention is installed as previously shown in FIG. 1. Downwardly from the heel, the invention has a tube 8 of constant outer diameter less than that of the heel and of the hip. The tube has a length proportional to a typical rim thickness. The tube though passes through the hole in a rim and its hollow construction provides an air passage into a tire. Beneath the tube, the invention has a truncated conical wedge 9 generally opposite that of the heel 7. The wedge has a slightly less diameter than the heel and an inward taper outwardly from the shoulder. The wedge has a length greater than that of the tube and slightly less than the heel. The wide portion of the wedge, as shown, abuts the outside surface of a rim R when the invention is installed as previously shown in FIG. 1. Outwardly from the wedge 9, the invention has a second wedge 10 which has a maximum diameter less than that of the wedge 9 and a much shorter length than the wedge 9. The second wedge is also hollow. And beneath the second wedge, the invention has an umbrella nut 11. The umbrella nut threadily engages upon the invention proximate the second wedge. To engage the second wedge, the umbrella nut has a cylindrical portion 11a with internal threads, preferably right handed, not shown. Opposite the cylindrical portion, the umbrella nut has six faces 11b spaced outwardly from the cylindrical portion and parallel to the surface of the cylindrical portion. The six faces receive a head from a tool such as a wrench, pliers, or socket among others. The umbrella nut may include the second wedge 10. Turning the umbrella nut clockwise advances it towards the tube and compresses the wedge 9 against the heel 7 providing a firm fit, or grip, of the invention to the rim R itself upon installation. And turning the nut counterclockwise retreats the umbrella nut away from the tube and loosens the invention from the rim R for removal of the invention from a wheel. The hip 6, heel 7, tube 8, wedge 9 cooperate as a gasketing body that compresses upon action of the umbrella nut 11. Because the umbrella nut compresses the gasketing body, the invention may rotate in the hole of the rim without compromising the fitment of the invention to the rim. The invention allows for a tight fit to the rim without any air leaks as the invention endures what operators and the environment throw at it.

Figure 3:
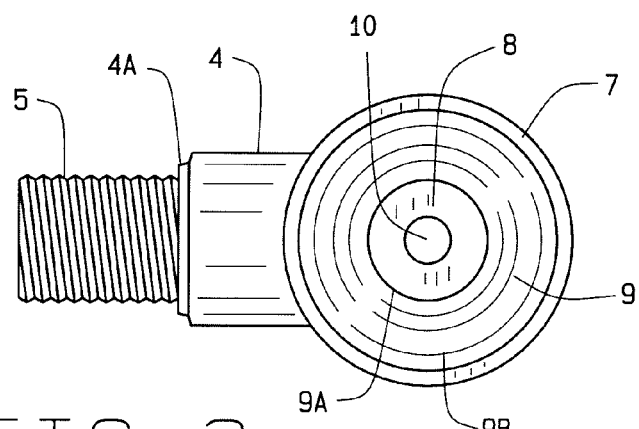
FIG. 3 shows a bottom view of the invention, particularly the outlet.

With the umbrella nut not shown, FIG. 3 provides a bottom view of the invention, that is, as a mechanic would view it when installing the invention. This view appears when observing the outside of the rim R. The invention has its inlet 5 to the left that proceeds to the step 4a and then to the neck 4. The neck joins perpendicularly to the remainder of the invention so that it is perpendicular to the tube 8. As above, the neck merges into the shoulder 2 that descends to its heel 7 that has the largest diameter of the components away from the neck. The heel has a generally round shape in cross section as shown. Inwardly from the heel, the invention has the wedge 9 shown with its narrow portion as at 9a inwardly and its wide portion as at 9b outwardly in the figure. The wedge has an outer diameter less than that of the heel 7. Within the narrow portion, the invention has the tube 8, with its thickness, here shown on end but hollow for the passage of air through an aperture 10. The aperture extends into the invention and then achieves communication into the inlet for passage of air from the inlet through a ninety degree turn into the tube and then to the tire.

Figure 4:
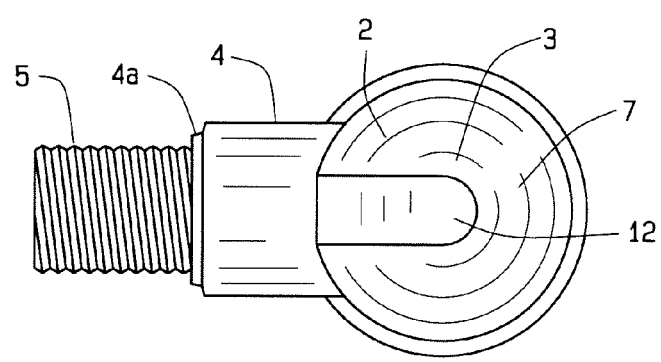
FIG. 4 illustrates a top view opposite that of FIG. 3.

Opposite FIG. 3, FIG. 4 shows a top view of the invention as a motorcycle rider would see it such as when checking tire pressure or adding air into a tire. The invention has its inlet 5 to the left, then the step 4a to the neck 4. The inlet has its hollow round shape with external threads as before and it joins to the neck. The neck continues at its diameter and then merges into the shoulder 2. The shoulder has its larger diameter than the neck and the neck adjoins to approximately 25% of the shoulder. Generally inline with the neck and the inlet, the shoulder has a ridge 12, generally flattened. The ridge extends from the neck to slightly past the center of the shoulder. The bevel 3 then descends downwardly from the ridge and around the common center of the shoulder, slightly before the end of the ridge. The bevel reaches its maximum radius away from the ridge and outwardly from the neck. Outwardly from the bevel, the shoulder has the heel 7. The heel extends slightly beyond the shoulder but enough distance to provide a firm surface, or edge, when the heel abuts the rim of a wheel.

Figure 5:
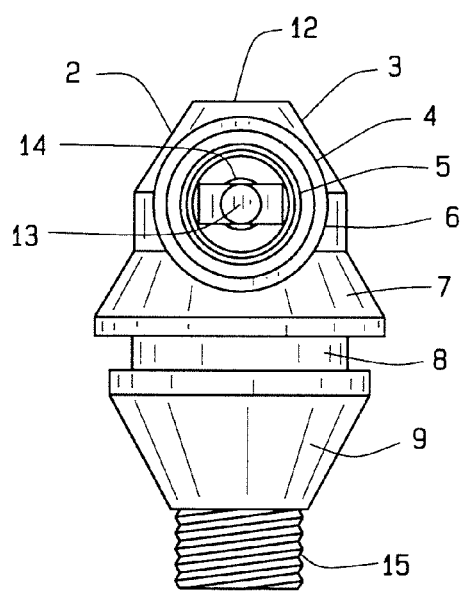
FIG. 5 illustrates a front view of the invention showing the valve for attachment of an air source.

Turning the invention 1, FIG. 5 shows a front view as the invention 1 may receive an air chuck, not shown, for inflation of a tire. The invention has its shoulder 2 with its ridge 12 towards the top and center of the drawing. The shoulder has its beveled shape, akin to a truncated cone. Outwardly from the shoulder towards the viewer, that is, in the foreground, the invention has the neck 4, here shown on end, with the inlet 5, each having a generally round cross section with the inlet extending outwardly from the neck upon a common center line. Within the inlet, the invention has a valve stem 13 that has a bias, as at 14, towards closure. The valve stem admits air or other gas under pressure into the invention and when the pressure decreases the biasing action of the valve stem closes it against a seat, shown later in FIG. 7. The biasing action keeps the valve closed and the air or other gas within the tire. The valve stem, similar to a Schrader valve has a plunger with a head upon a spring loaded pin. The pin has a solid round cylindrical shape of lesser diameter than the head. The pin has sufficient length to extend flush with the inlet 5 and a longitudinal axis parallel to the longitudinal axis of the neck. Upon one end, the pin has a head also a round cylinder of greater diameter than the pin. The valve stem has external threads that match the internal threads of the inlet so that the valve stem seals into the inlet preventing air losses alongside the valve stem.

Rearward from the valve stem 13, that is, in the background, FIG. 5 shows the shoulder 2 descending to its hip 6. The hip is generally round and of a diameter exceeding that of the neck to its front. The hip though has a height shorter than the neck's radius. The hip extends beneath the shoulder to the heel 7 that flares outwardly akin to a truncated cone. The heel has its maximum radius away from the neck and larger than a typical manufacturers hole through a rim R. Beneath the heel, the invention has the tube 8 of lesser diameter than the heel. The tube though has a length proportional to the typical thickness of a rim. The tube then merges with the wide portion of the wedge 9. The wedge tapers in its diameter away from the tube and the shoulder. At its narrowest, the wedge merges with an outlet 15. The outlet has external threads and hollow construction for passage of air through it and into a tire. The threads 15a of the outlet receive the umbrella nut 11, previously described.

Figure 6:
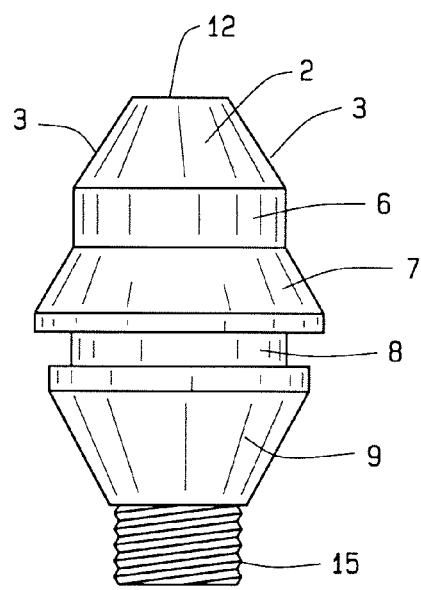
FIG. 6 provides a back view of the invention opposite that of FIG. 5.

Looking away from the inlet and the neck, FIG. 6 shows the invention with its outlet 15 towards the bottom of the figure. The outlet has its threads to which the umbrella nut engages. The outlet then merges to the narrow portion of the wedge 9 which then receives the tube 8 at its wide portion. The wide portion of the wedge abuts the outside surface of a rim when installed. The tube then has less diameter than the wide portion of the wedge 9 and the heel 7. The tube has a diameter though proportional to the hole in a rim provided by its manufacturer. The heel also has a truncated conical shape like the wedge but the heel is oriented opposite that of the wedge. The wide portion of the heel abuts the inside surface of a rim when the invention is installed as previously shown in FIG. 1. The heel narrows and merges into the cylindrical hip 6 beneath the shoulder 2. The shoulder narrows inwardly along its bevel 3 to its ridge 12 shown as the flat top to the invention in this figure.

Figure 7:
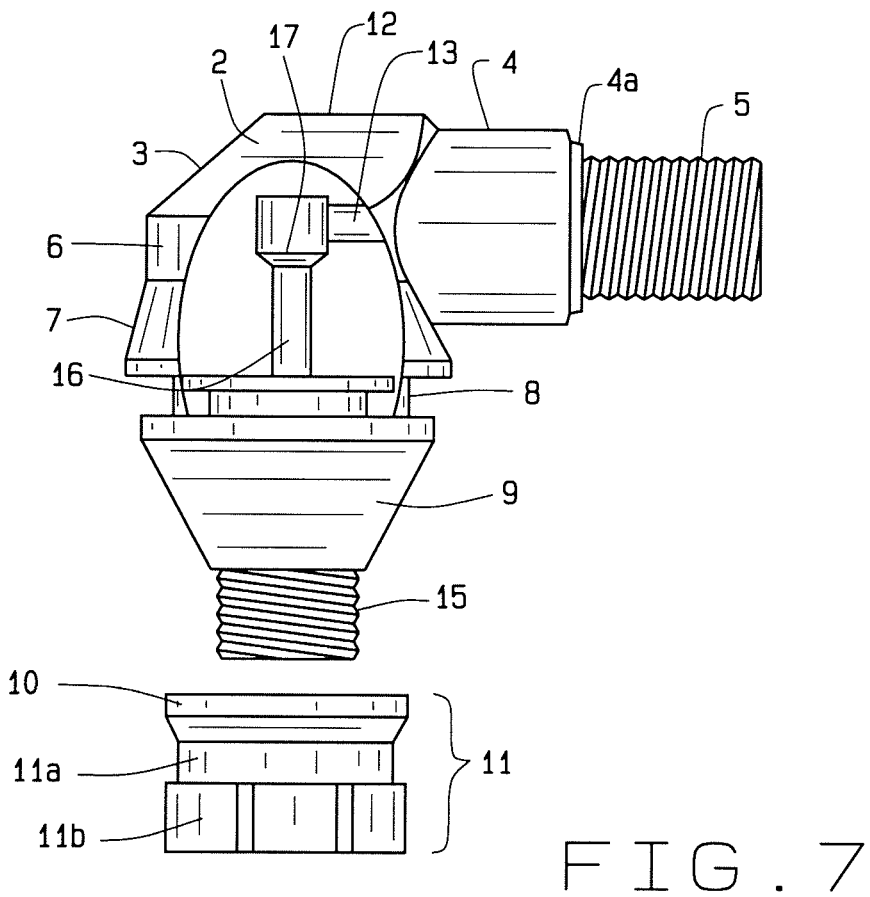
FIG. 7 describes a partial sectional view showing the valve seat and intersection of internal passages; and, FIG. 8 shows an exploded view of the tubes of the invention.

Viewing a portion of the invention internally, FIG. 7 provides a portion of the flowpath of air through the invention. As above, air enters the invention through the inlet 5 passes through the neck 4, and then flows past the valve stem 13 within the shoulder 2. Generally beneath the ridge opposite the neck, the valve stem passes upon a seat 17. The seat admits air into a passage 16 perpendicular to the valve stem. Upon pressing the valve stem 13, it moves slightly off the seat and allows the flow of air through the invention. The passage continues through the heel 7, the tube 8, into the wedge 9, and through the outlet 15 for admission into an attached tire, not shown. The outlet and the wedge secure against the rim of a wheel by compression through turning of the umbrella nut 11.

Figure 8:
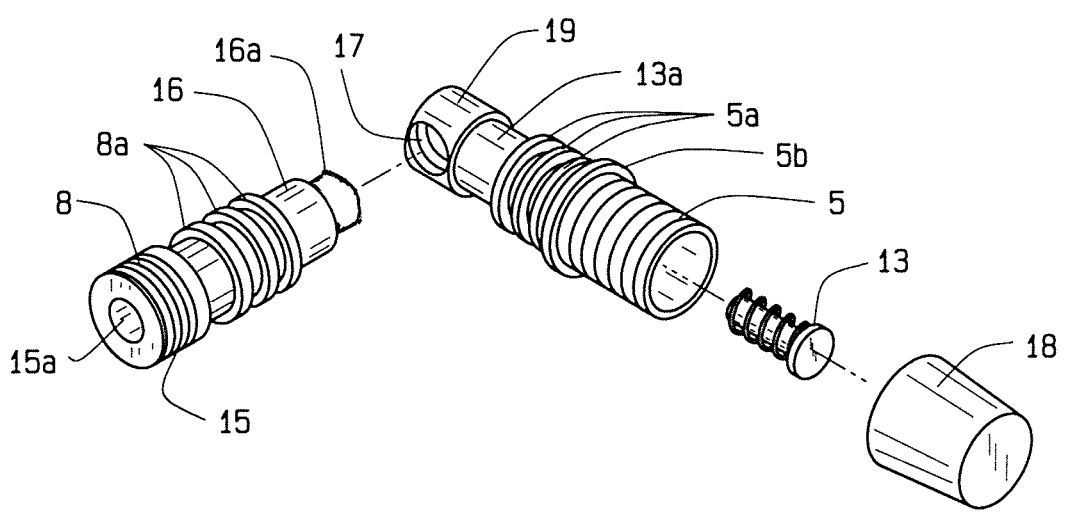

The previous drawings have referred to the neck, shoulder, hip, heel, and wedge. These are the externally visible components of the invention. FIG. 8 though shows an exploded view of the internal components of the invention located within the neck, shoulder, hip, heel, and wedge. These internal components admit, pass, and exit air or other gases through the invention. So, the internal components begin with a cap 18 shown towards the right. The cap generally threadily engages the inlet and prevents debris from entering the invention. Inwardly from the cap, the invention includes the biased valve stem 13. The valve stem operates as a unit and draws the reaction force to its bias action from the inlet. The valve stem threadily engages the internal threads proximate the inlet 5. The inlet includes external threads that engage the cap 18 or a threaded chuck, not shown. The inlet remains hollow for admission of air therein. Inwardly from the threading, the inlet has a flange 5b of greater diameter than the inlet and its threads. The flange serves as the narrow end of the neck 4. The inlet 5 continues hollow through the flange. Inwardly from the flange, the inlet merges with a hollow round cylindrical tube 13a that extends through the neck and partially through the shoulder. The tube 13a includes at least one ring as at 5a, and preferably three spaced rings as shown. The rings assist the shoulder in grasping the material of the tube 13a. Opposite the flange, the tube 13a has a hollow chamber 19 upon an end. The chamber has the valve seat 17, generally round, here shown perpendicular to the length of the tube 13a. The valve seat also may have internal threading or alternatively the valve seat has a smooth finish for a fit suitable for a soldered or brazed connection.

Perpendicular to the length of the tube 13a and the inlet 5, the valve seat receives a tip 16a extending from the passage 16 through the tube 8. The tip is hollow and has an external surface that smoothly meshes with the internal surface of the valve seat 17 for a preferably soldered or brazed connection. Alternatively, the tip has external threading that meshes with internal threading of the valve seat 17. Alternatively, the tip connects to the valve seat with an interference fit, welding, or adhesives. Outwardly from the tip, that is, away from the valve seat, the tube has a larger diameter and greater length than the tip. The tube remains hollow, allowing passage of air and other gases from the valve seat through it. Approximately mid length, the tube includes at least one ring 8a, preferably three spaced apart rings. These rings allow the heel 7 and the wedge 9 to grasp the material of the tube. The rings have an outer diameter exceeding that of the tube. Outwardly from the rings, the tube continues at its diameter as it reaches the outlet 15. The outlet has a slightly larger diameter than the tube and external threads that engage the umbrella nut, not shown. The length of the outlet with threads is approximately similar to the diameter of the tube. Then opposite the tip, the outlet opens at the exit 15a from the passage 16. The passage 16 extends from the tip through the tube to the exit. The exit has a diameter similar to that of the passage and less than that of the outlet. The exit admits the air or other gases into a tire following installation of the invention in a rim of a wheel.

From the aforementioned description, a reinforced valve stem has been described. The reinforced valve stem is uniquely capable of inserting from the inside outwardly through a hole in a rim of a wheel and resisting pull out over its design lifespan. The inlet, tube, elbow, outlet, tube, tip, and related items are made from preferably brass and the neck, shoulder, hip, heel, and wedge, are made preferably from urethane to prevent marring of wheels. The urethane may have a color selected from a pallet. The urethane also has a Shore hardness of approximately 70 and resists chemical, biological, and ultraviolet light degradation over its lifespan. The urethane utilized in the invention has a long design life in rugged conditions. The reinforced valve stem and its various components may be manufactured from many materials, beyond those preferred, including but not limited to, polymers, polyvinyl chloride, polyethylene, polypropylene, urethane, nylon, rubber, latex, steel, ferrous and non-ferrous metals, their alloys, and composites.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A device for admitting and releasing gases into a tire on a wheel rim, the rim having a hole for admitting the device and the rim having an inside facing the tire and an opposite outside facing a hub, said device preventing leakage of gases while allowing for rotation of said device in the hole, said device comprising:

a threaded inlet, generally round in cross section and having a diameter, a biased axial valve stem within said threaded inlet, said valve stem adapted to admit air into said device;

a neck axially inward from said inlet, generally round in cross section and having a diameter greater than that of said inlet;

a shoulder axially inward from said neck and having a width greater than the diameter of said neck, said shoulder adapted to transition the flow of gases through said device perpendicular to the orientation of said inlet;

a hip beneath said shoulder and said neck, said hip having a diameter proportional to the width of said shoulder, said hip having an orientation perpendicular to said neck;

a heel beneath said hip and said neck, said heel having a generally truncated conical shape and round cross section widening outwardly from a first diameter to a second diameter, said second diameter being greater than said first diameter, said heel is adapted to abut the rim proximate the hole;

a tube beneath said heel, said tube being hollow for passage of gases therethrough, said tube being centered upon said heel and in communication with said inlet through said shoulder;

a wedge spaced below said heel and centered upon said tube, said wedge having a generally inverted truncated conical shape and round cross section narrowing axially from a first diameter to a second diameter, said second diameter being smaller than said first diameter, said wedge is adapted to enter the hole of the wheel;

a threaded outlet, generally round in cross section, extending from said wedge and in communication with said tube, said threaded outlet is adapted to enter the hole of the wheel, and wherein said threaded outlet is generally perpendicular to said threaded inlet;

an umbrella nut cooperatively engaging said threaded outlet and compressing said wedge axially upon turning said umbrella nut;

wherein said wedge is adapted to insert into the hole of the rim, said heel is adapted to abut said rim and said device is adapted to insert from the outside of said rim to the inside of said rim.

2. The gas admission and release device of claim 1 further comprising:

said threaded inlet including a flange axially inward from said valve stem, said flange having a diameter exceeding that of said inlet, a second tube axially inward from said flange and in communication with said valve stem, at least two rings spaced upon said second tube, said at least two rings having a diameter less than said flange and greater than said second tube, and an elbow terminating said second tube opposite said inlet and having a valve seat in a plane generally perpendicular to said second tube;

said threaded outlet including an exit in communication with said tube;

said tube having at least two spaced apart rings, said at least two rings having a diameter larger than said tube, and a tip opposite said exit; and, said tip joining to said valve seat wherein said device attains a generally L shape.

3. The gas admission and release device of claim 1 further comprising:

said threaded outlet having right hand threads and counterclockwise rotation of said umbrella nut advancing said umbrella nut upon said wedge.

4. The gas admission and release device of claim 1 wherein said neck, said shoulder, said hip, said heel, and said wedge are made of a flexible material.

5. The gas admission and release device of claim 4 wherein said neck, said shoulder, said hip, said heel, and said wedge resist chemical degradation and ultraviolet light degradation.

6. A device for admitting and releasing gases into a tire on a wheel rim, the rim having a hole for admitting the device and the rim having an inside facing the tire and an opposite outside facing a hub, said device preventing leakage of gases while allowing for rotation of said device in the hole, said device comprising:

a threaded inlet, generally round in cross section and having a diameter, a biased axial valve stem within said threaded inlet, said valve stem adapted to admit air into said device, said threaded inlet including a flange axially inward from said valve stem, said flange having a diameter exceeding that of said inlet, a second tube axially inward from said flange and in communication with said valve stem, at least two rings spaced upon said second tube, said at least two rings having a diameter smaller than said flange and greater than said second tube, and an elbow terminating said second tube opposite said inlet and having a valve seat in a plane generally perpendicular to said second tube;

a neck axially inward from said inlet, generally round in cross section and having a diameter greater than that of said inlet;

a shoulder axially inward from said neck and having a width greater than the diameter of said neck, said shoulder adapted to transition the flow of gases through said device perpendicular to the orientation of said inlet;

a hip beneath said shoulder and said neck, said hip having a diameter proportional to the width of said shoulder, said hip having an orientation perpendicular to said neck;

a heel beneath said hip and said neck, said heel having a generally truncated conical shape and round cross section widening outwardly from a first diameter to a second diameter, said second diameter being greater than said first diameter, said heel is adapted to abut the rim proximate the hole;

a tube beneath said heel, said tube being hollow for passage of gases therethrough, said tube being centered upon said heel and in communication with said inlet through said shoulder;

a wedge spaced below said heel and centered upon said tube, said wedge having a generally inverted truncated conical shape and round cross section narrowing axially from a first diameter to a second diameter, said second diameter being smaller than said first diameter, said wedge is adapted to enter the hole of the wheel;

a threaded outlet, generally round in cross section, extending from said wedge and in communication with said tube, said threaded outlet is adapted to enter the hole of the wheel, and wherein said threaded outlet is generally perpendicular to said threaded inlet, said threaded outlet including an exit in communication to said tube, said tube having at least two spaced apart rings, said at least two rings having a diameter larger than said tube, and a tip opposite said exit, said tip joining to said valve seat wherein said device attains a generally L shape;

an umbrella nut cooperatively engaging said threaded outlet and compressing said wedge axially upon turning said umbrella nut, said threaded outlet having right hand threads and counterclockwise rotation of said umbrella nut advancing said umbrella nut upon said wedge; and, wherein said wedge is adapted to insert into the hole of the rim, said heel is adapted to abut said rim and said device is adapted to insert from the outside of said rim to the inside of said rim.

7. The gas admission and release device of claim 6 wherein said threaded inlet, said tube, and said threaded outlet are formed as a single piece.

\* \* \* \* \*